United States Patent [19]

Howe, Jr. et al.

[11] Patent Number: 4,616,335

[45] Date of Patent: Oct. 7, 1986

[54] APPARATUS FOR SUSPENDING A SYSTEM CLOCK WHEN AN INITIAL ERROR OCCURS

[75] Inventors: Leland D. Howe, Jr., Owego; Bharatkumar J. Oza, Endicott; Thomas J. Roche, Endwell, all of N.Y.

[73] Assignee: International Business Machines Corporation, Armonk, N.Y.

[21] Appl. No.: 509,494

[22] Filed: Jun. 30, 1983

[51] Int. Cl.[4] ............................................. G06F 11/00
[52] U.S. Cl. ...................................... 364/900; 371/14
[58] Field of Search .................... 371/14, 12, 15, 19, 371/20, 61, 62, 29; 364/186, 200 MS File, 900 MS File

[56] References Cited

U.S. PATENT DOCUMENTS

| | | | |
|---|---|---|---|
| 3,810,120 | 5/1974 | Huettner et al. | 364/200 |
| 4,072,852 | 2/1978 | Hogan et al. | 364/900 |
| 4,348,722 | 9/1982 | Gunter et al. | 364/200 |
| 4,348,762 | 9/1982 | Shiun et al. | 371/61 |
| 4,392,226 | 7/1983 | Cook | 371/61 |
| 4,423,508 | 12/1983 | Shiozaki et al. | 371/19 |
| 4,428,076 | 1/1984 | Schuon | 371/5 |
| 4,463,440 | 7/1984 | Nishiura et al. | 364/900 |
| 4,464,751 | 8/1984 | Stranko et al. | 364/900 |
| 4,486,826 | 12/1984 | Wolff et al. | 364/200 |
| 4,539,682 | 9/1985 | Herman et al. | 371/15 |

OTHER PUBLICATIONS

"Complete Fault Detection and Fault Location for System Oscillator", by Herceg et al.; IBM Technical Disclosure Bulletin, vol. 22, No. 1, 6/79.

Primary Examiner—James D. Thomas
Assistant Examiner—Thomas Lee
Attorney, Agent, or Firm—John H. Bouchard

[57] ABSTRACT

An apparatus disposed within a computer system is disclosed for sensing the existence of an error occurring within a computer system and for suspending an internal system clock when a certain number of clock pulses are generated following the occurrence of the error. When the internal system clock is suspended, operation of the computer system stops. In the preferred embodiment, the internal system clock is suspended when two (2) clock pulses are generated following the occurrence of the error. As a result, it is not necessary to wait until execution of the current instruction is complete before stopping the operation of the computer system. Therefore, other errors are not generated within the computer system as a result of the generation of the initial error.

4 Claims, 4 Drawing Figures

APPARATUS FOR SUSPENDING A SYSTEM CLOCK WHEN AN INITIAL ERROR OCCURS

BACKGROUND OF THE INVENTION

1. Field of the Invention

The subject matter of the present invention pertains to a computer system, and more particularly, to an apparatus within said computer system for suspending a system clock, during execution of an instruction, a predetermined number of clock pulses after an initial error occurs in said system.

2. Description of the Prior Art

In a computer system, during the execution of an instruction, a certain number of clock pulses are generated for the purpose of assisting in the execution of the instruction. If an error occurred during the execution of the instruction, the operation of the computer system could be stopped only when the execution of the instruction was complete. However, a substantial time period elapsed, that is, a substantial number of clock pulses were generated, from the time the initial error occurred to the time when execution of the instruction was complete. As a result of the initial error, and the elapsed time period, other errors were generated within the system.

In the computer systems of the prior art, such as those disclosed in IBM Technical Disclosure Bulletin, Vol. 20, No. 6, November 1977, page 2193, or IBM Technical Disclosure Bulletin, Vol. 22, No. 3, August 1979, page 1169, when the computer system was stopped upon completion of the execution of the instruction, a specific clock pulse was arbitrarily selected and the instruction was re-executed. The computer system would stop when the selected clock pulse was generated during the execution of the instruction. The customer engineer would then attempt to determine the cause of the error, as well as the specific time when the error occurred. However, the other errors, generated as a result of the initial error, still existed in the computer system. If the computer system could have been stopped when the initial error occurred, or at least at some predetermined time prior to the completion of the execution of the instruction, the other errors would not have been generated. In addition, the customer engineer would still have been able to determine the cause of the error, as well as the specific time when the error occurred.

SUMMARY OF THE INVENTION

Accordingly, it is a primary object of the present invention to sense the existence of an initial error occurring within a computer system during the execution of an instruction, and to stop the computer system a predetermined time period following the occurrence of the error and prior to the completion of the execution of the instruction.

It is a further object of the present invention to sense the existence of the initial error and to stop the computer system when two (2) clock pulses are generated, during the execution of the instruction, following the occurrence of the initial error.

These and other objects of the present invention are achieved, in accordance with the present invention, by sensing the existence of an initial error, and stopping the computer system, that is, suspending an internal system clock, when a predetermined number of clock pulses (e.g.—two clock pulses) are generated during the execution of an instruction. As a result, the other errors are not generated and the determination of the cause and the specific time of occurrence of the error may be made.

Further scope of applicability of the present invention will become apparent from the detailed description given hereinafter. However, it should be understood that the detailed description and the specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWING

A full understanding of the present invention will be obtained from a reading of the detailed description given hereinbelow and the accompanying drawings, which are given by way of illustration only, and thus are not limitative of the present invention, and wherein.

DESCRIPTION OF THE PREFERRED EMBODIMENT

Figure 1:
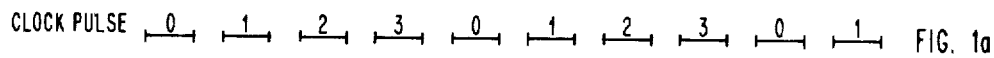
FIG. 1 illustrates an example of the prior art wherein a system clock is stopped when execution of an instruction is completed following occurrence of an initial error.
Figure 1:
Figure 1:
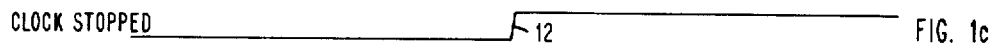
Figure 1:
Figure 1:

Referring to FIG. 1, an example of the prior art is illustrated wherein a system clock is stopped when execution of an instruction is completed following the occurrence of an initial system error. In FIG. 1a, a plurality of clock pulses are illustrated. An instruction is executed during the occurrence of clock pulses 1, 2, 3, and 0. When the occurrence of clock pulse 0 is complete, execution of the instruction is complete. In FIG. 1b, an initial system error may occur during the generation of clock pulse 0 or clock pulse 1, as indicated by region 10 in FIG. 1b. In FIG. 1c, an internal system clock is stopped, stopping operation of the computer system, upon completion of occurrence of clock pulse 0, as indicated by region 12 of FIG. 1c. The completion of generation of clock pulse 0 indicates the completion of execution of the instruction. Note that, in FIGS. 1a through 1c, either three or four clock pulses are generated from the time the error occurred, to the time the system clock stopped (depending upon the exact time when the initial system error occurred).

In FIG. 1d, an initial system error occurs during the generation of clock pulses 2 or 3, as indicated by region 14. However, the internal system clock cannot be stopped until the generation of clock pulse 0 is completed following the next subsequent zero (0) clock pulse, as indicated by region 16 of FIG. 1e. In FIGS. 1d and 1e, either five or six clock pulses were generated from the time the initial error occurred to the time the internal system clock stopped. As a result, other errors were created within the computer system due to the existence of the initial system error.

Figure 2:
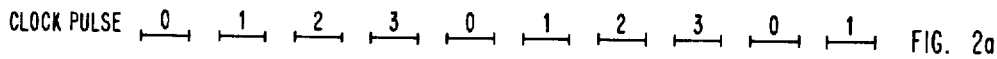
FIG. 2 illustrates an example of the present invention wherein a system clock is suspended when two (2) clock pulses are generated following occurrence of an initial error.
Figure 2:
Figure 2:
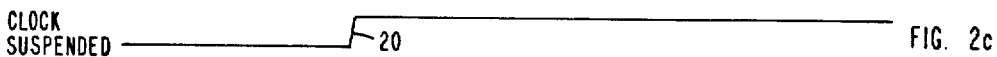
Figure 2:
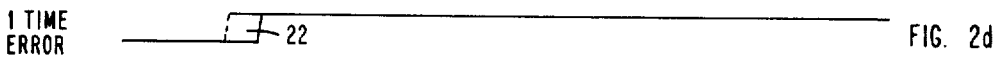
Figure 2:
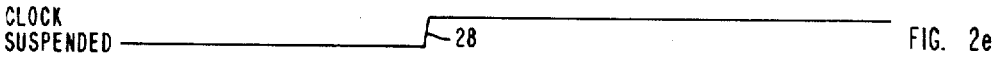
Figure 2:
Figure 2:
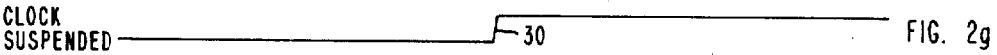
Figure 2:
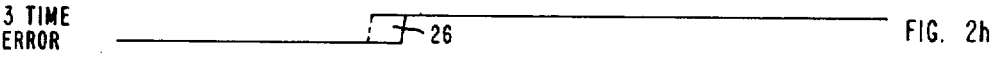
Figure 2:
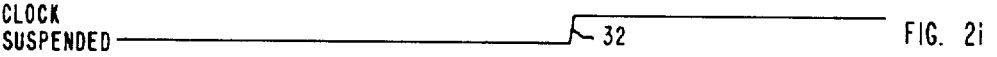

Referring to FIG. 2, an example of the present invention is illustrated wherein a system clock is suspended when two (2) clock pulses are generated following occurrence of an initial error. In FIG. 2a, a plurality of clock pulses are illustrated, the clock pulses being generated during the execution of an instruction. As before, an instruction is being executed during the generation of clock pulses 1, 2, 3, and 0. When the generation of clock pulse 0 is complete, execution of the instruction is complete. In FIG. 2b, an initial error occurs during the generation of clock pulse 0, as indicated by region 18. In accordance with the present invention, the internal system clock is suspended, supending the computer system, when a predetermined number of clock pulses are generated following the occurrence of the initial error. In FIG. 2c, the system clock is suspended when two (2) clock pulses are generated following the occurrence of the initial error, as indicated by region 20. Similarly, in each pair of FIGS. 2d and 2e, 2f and 2g, and 2h and 2i, an initial error occurs during the generation of a clock pulse, as indicated by regions 22, 24, and 26, and the system clock is suspended when a predetermined number of clock pulses (in the figures, two clock pulses) are generated following the occurrence of the initial error, as indicated by regions 28, 30, and 32.

Figure 3:
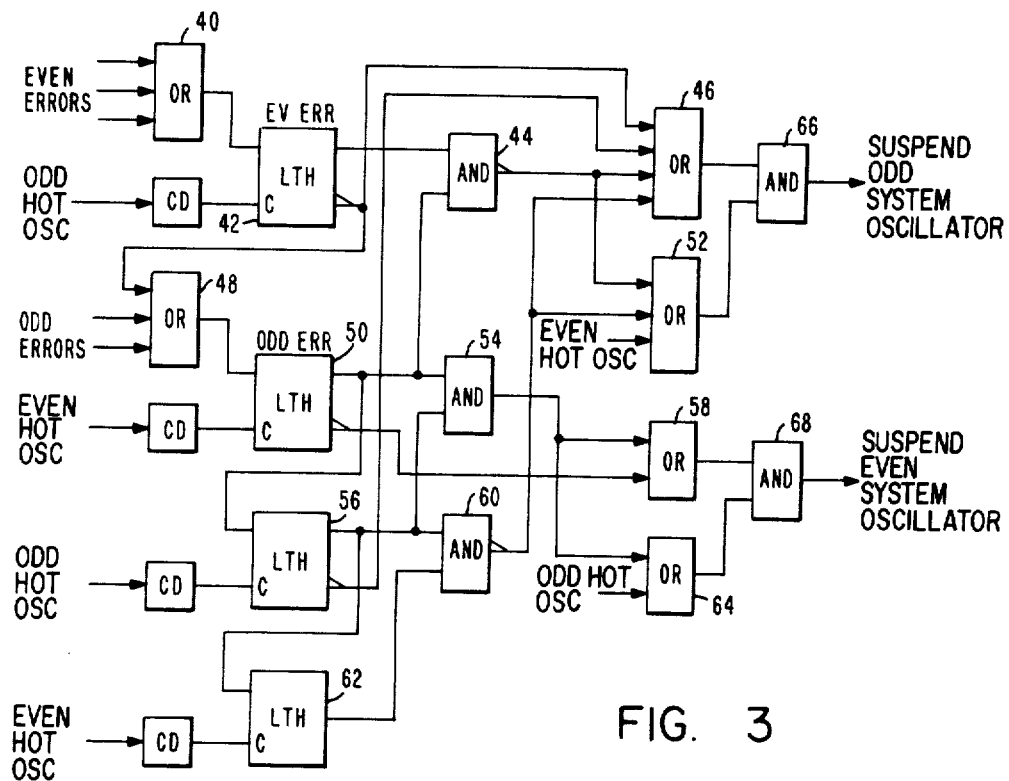
FIG. 3 illustrates an apparatus of the present invention for suspending a system oscillator when two clock pulses are generated following occurrence of an initial error.
Figure 4:
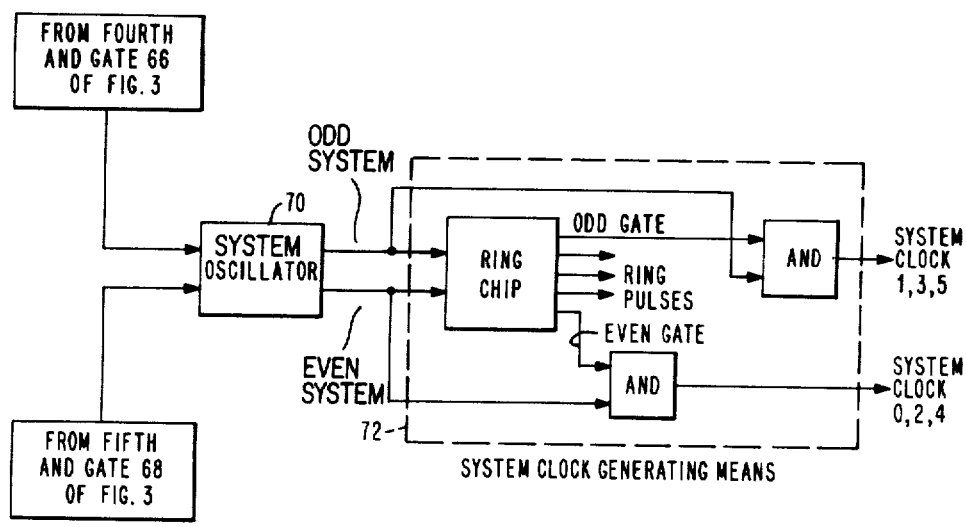
FIG. 4 illustrates an apparatus for suspending the system clock in response to the suspension of the system oscillator by the apparatus illustrated in FIG. 3.

Referring to FIGS. 3 and 4, the apparatus according to the present invention is illustrated for suspending a system clock when a predetermined number of clock pulses are generated following the occurrence of an initial error in the computer system. The preferred embodiment, according to the present invention, suspends the system clock when two (2) clock pulses are generated following the occurrence of the initial error. However, it would be apparent to one skilled in the art that the system clock may be suspended when any predetermined number of clock pulses are generated following the occurrence of the initial error for the purpose of identifying the time of occurrence as well as the cause of the initial error. For the purpose of discussion of the invention with reference to FIG. 3, a system oscillator and a hot oscillator are two different oscillators. The hot oscillator is free-running and remains free-running even when the system oscillator has been suspended.

In FIG. 3, a first OR gate 40 receives an initial system error, the error occurring during the generation of an even clock pulse (pulses 0, 2, 4, etc.), the error hereinafter referred to an even error. The first OR gate 40 is connected to one input terminal of a first latch circuit 42. The other input terminal of the first latch circuit 42 receives an odd hot oscillator (clock) pulse. One output terminal of the first latch circuit 42 is connected to a first AND gate 44. Another output terminal of the first latch circuit 42 is connected to one input terminal of a second OR gate 46. The other output terminal of the first latch circuit 42 is also connected to one input terminal of a third OR gate 48. The other input terminals of the third OR gate 48 receive the initial system errors occurring during the generation of the odd clock pulse (pulses 1, 3, 5, etc.), hereinafter referred to as an odd error. The output terminal of the third OR gate 48 is connected to one input terminal of a second latch circuit 50. The other input terminal of the second latch circuit 50 receives an even hot oscillator (clock) pulse. One output terminal of the second latch circuit 50 is connected to another input terminal of the first AND gate 44. An output terminal of the first AND gate 44 is connected to an input terminal of the second OR gate 46 and to an input terminal of the fourth OR gate 52. The one output terminal of the second latch circuit 50 is also connected to one input terminal of a second AND gate 54, and to one input terminal of a third latch circuit 56. The other input terminal of the third latch circuit 56 receives the odd hot oscillator (clock) pulse. The other output terminal of the second latch circuit 50 is connected to one input terminal of a fifth OR gate 58. One output terminal of the third latch circuit is connected to another input terminal of the second AND gate 54. The output terminal of the second AND gate 54 is connected to another input terminal of the fifth OR gate 58, and to an input terminal of a sixth OR gate 64. Another input terminal of the sixth OR gate 64 receives the odd hot oscillator (clock) pulses. Another output terminal of the third latch circuit 56 is connected to still another input terminal of the second OR gate 46. Said one output terminal of the third latch circuit 56 is also connected to an input terminal of a third AND gate 60, and to one input terminal of a fourth latch circuit 62. Another input terminal of the fourth latch circuit 62 receives the even hot oscillator (clock) pulses. An output terminal of the fourth latch circuit 62 is connected to another input terminal of the third AND gate 60. The output terminal of the third AND gate 60 is connected to a further input terminal of the second OR gate 46 and to another input terminal of the fourth OR gate 52. A further input terminal of the fourth OR gate 52 receives the even hot oscillator (clock) pulses. The output terminals of the second and fourth OR gates 46 and 52 are connected to a first and second input terminal of a fourth AND gate 66. The output terminal of the fourth AND gate 66 is connected to a system oscillator 70 illustrated in FIG. 4 and will suspend the odd cycles of the system oscillator. The output terminals of the fifth and sixth OR gates 58 and 64 are connected to a first and a second input terminal of a fifth AND gate 68. The output terminal of the fifth AND gate 68 is connected to the system oscillator 70 of FIG. 4 and will suspend the even cycles of the system oscillator.

In FIG. 4, system oscillator 70 receives an output signal from the fourth AND gate 66 of FIG. 3, the odd oscillator cycles being suspended in response to said output signal. The system oscillator 70 receives an output signal from the fifth AND gate 68 of figure 3, the even oscillator cycles being suspended in response to said output signal from the fifth AND gate. The oscillator 70 is connected to a system clock generating means 72 for generating a system clock in response to the odd and even cycles from oscillator 70. If the odd and even cycles of system oscillator 70 are suspended, the system clock generating means suspends the generation of the system clock. As a result, the computer system is stopped.

The functional operation of the apparatus of the present invention, for suspending a system clock when an initial error occurs, will be described in the paragraphs below with reference to FIGS. 3 and 4.

For the purposes of this discussion, in describing the functional operation of the apparatus of the present invention, assume that an initial error occurs during the generation of a first even clock pulse, the initial error being referred to as an even error. The first even clock pulse is designated as an E1 pulse. A first odd clock pulse, designated by O1, follows the E1 pulse. A second even clock pulse, designated by E2, is generated following the generation of the O1 pulse. A second odd clock pulse, designated by O2, is generated following the generation of the E2 pulse.

An even error is received by the first OR gate 40 during the generation of the E1 clock pulse. As a result, an output signal is generated by the first OR gate 40 energizing the one input terminal of the first latch circuit 42. When the O1 pulse from the odd hot oscillator energizes the other input terminal of the first latch circuit 42, an output signal is developed from both output terminals of the first latch circuit 42. One of the output signals, the signal generated from said another output terminal of the first latch circuit 42, energizes the input terminal of the second OR gate 46. Another of the output signals energizes one input terminal of the first AND gate 44. However, gate 44 does not yet generate an output signal since a signal does not yet energize the other input terminal. As a result, an output signal is generated from the second OR gate 46 energizing the first input terminal of the fourth AND gate 66 during the generation of the O1 pulse. When the even hot oscillator pulse (E2) energizes the further input terminal of the fourth OR gate 52, an output signal is generated from the fourth OR gate 52, energizing the second input terminal of the fourth AND gate 66. An output signal is generated from the fourth AND gate 66, at the beginning of the E2 pulse, for suspending the odd cycles system of oscillator 70 illustrated in FIG. 4.

Since the odd cycles of system oscillator 70 have been suspended at the beginning of the E2 pulse, the portion of the apparatus of FIG. 3, as described above, which is responsible for generating the output signal from AND gate 66 at the beginning of the E2 pulse, thereby suspending the odd cycles of oscillator 70, is referred to as a "speed up circuit". The "speed up circuit" provides a starting point for the blocking function of the present invention thereby preventing the generation of partial clocks.

When an output signal is generated from said another output terminal of the first latch circuit 42, in addition to energizing the one input terminal of the second OR gate 46, the output signal also energizes the one input terminal of the third OR gate 48. Therefore, the one input terminal of the second latch circuit 50 is energized. When the E2 pulse from the even hot oscillator energizes the othe rinput terminal of the second latch circuit 50, an output signal is generated from output terminals of circuit 50. The output signal from said one output terminal of latch circuit 50 (1) energizes the other input terminal of the first AND gate 44 thereby causing the generation of an output signal therefrom (2) energizes one input terminal of the third latch circuit 56, and (3) energizes one input terminal of the second AND gate 54. The output signal from the other output terminal of the latch circuit 50 energizes the one input terminal of the fifth OR gate 58 in order to speed up a subsequent block of the even pulses. Since, at this point, the O2 pulse is not yet generated, an output signal is not yet generated from the third latch circuit 56. As a result, an output signal is not generated from the second AND gate 54. Since an output signal is generated from the first AND gate 44, an input terminal of second and fourth OR gates, 46 and 52, are energized during the generation of the E2 pulse. Therefore, the output signal, generated from the fourth AND gate 66 at the beginning of the E2 pulse, is maintained.

As a result, it is evident that the first AND gate 44 is responsible for maintaining the suspension of the odd cycles of system oscillator 70 during the generation of the E2 pulse, the odd cycles being initially suspended by the "speed up circuit" when the E2 pulse is first initiated. When an output signal is generated from the other output terminal of the second latch circuit 50, energizing one input terminal of the fifth OR gate 58, and when the odd hot oscillator (O2 pulse) energizes the other input terminal of the sixth OR gate 64, the fifth AND gate 68 generates an output signal, at the beginning of the O2 pulse, initiating the blocking function of the even system oscillator. Initiation of the blocking function of the even system oscillator provides the starting point of the blocking function and prevents the generation of partial clocks.

When the O2 pulse from the odd hot oscillator energizes the other input terminal of the third latch circuit 56, an output signal is generated from both output terminals. An output signal appearing on the one output terminal (1) energizes the other input terminal of the second AND gate 54 causing an output signal to be generated therefrom (2) energizes an input terminal of the third AND gate 60 and (3) energizes one input terminal of the fourth latch circuit 62. An output signal is not yet generated from the fourth latch circuit 62 since another E1 pulse is not yet generated. Therefore, an output signal is not yet generated from the third AND gate 60. However, since an output signal is generated from the second AND gate 54, input terminals of OR gates 58 and 64 are energized. Therefore, fifth AND gate 68 generates an output signal, during the generation of the O2 pulse, for maintaining the suspension of the even cycles of the oscillator 70. The output signal appearing on the other output terminal of the third latch circuit 56 energizes the still another input terminal of the second OR gate 46. Since the further input terminal of the fourth OR gate 52 is energized by the E2 pulse from the even hot oscillator, the starting point of the blocking function is initiated, the blocking function being maintained by the third AND gate 60 when an output signal is generated from the fourth latch circuit 62 during the generation of the E1 pulse.

It should be noted that the even cycles of the system oscillator 70 were suspended upon the initiation of the O2 pulse, when two clock pulses were generated (pulses O1 and E2) following the occurrence of the initial even error, during the generation of the E1 pulse.

When a subsequent E1 pulse energizes the other input terminal of the fourth latch circuit 62, an output signal is generated therefrom for energizing the other input terminal of the third ANd gate 60. The third AND gate 60 generates an output signal for energizing OR gates 46 and 52. As a result, the fourth AND gate 66 generates an output signal for continuing the suspension of the odd cycles of oscillator 70.

Therefore, as a result of the occurrence of the initial even error, the odd and the even cycles of system oscillator 70 are suspended. As can be seen from FIG. 4, the system clock is suspended when two clock pulses (pulses O1 and E2) are generated following the initial occurrence of the even error. When the system clock is suspended, the computer system stops.

The invention being thus described, it will be obvious that the same may be varied in many ways. Such variations are not to be regarded as a departure from the spirit and scope of the invention, and all such modificiations as would be obvious to one skilled in the art are intended to be included within the scope of the following claims.

What is claimed:

1. In a computer system including a first oscillator means for generating clock pulses, second oscillator means for generating a system clock signal, means responding to said system clock signal for executing a set of instructions, and error determination means responding to the execution of said set of instructions for determining if an error has developed during the execution of one of said instructions and for developing an error signal when said error develops, an apparatus for stopping said computer system in response to said error signal, comprising:

system clock suspension means interposed between said first oscillator means and said second oscillator means and responding to said error signal from said error determination means and to said clock pulses from said first oscillator means for developing a suspension signal when a predetermined number of said clock pulses, greater than zero, are generated from said first oscillator means following the receipt of said error signal from said error determination means, said suspension signal suspending the generation of said system clock signal from said second oscillator means, the execution of said set of instructions terminating when said system clock signal is suspended, said computer system stopping when the execution of said set of instructions terminates, said system clock suspension means including, speed-up means responding to said error signal and to said clock pulses for generating said suspension signal at a leading edge of a selected clock pulse, said selected clock pulse being generated immediately subsequent to the generation of said predetermined number of clock pulses; and maintaining means connected to said speed-up means and responding to said selected clock pulse for maintaining the generation of said suspension signal following the generation of said suspension signal by said speed-up means.

2. The apparatus of claim 1 wherein said predetermined number of clock pulses comprises two (2) clock pulses.

3. In a computer system including a first oscillator means for generating clock pulses, second oscillator means for generating a system clock signal, means responding to said system clock signal for executing a set of instructions, and error determination means responding to the execution of said set of instructions for determining if an error has developed during the execution of one of said instructions and for developing an error signal when said error develops, an apparatus for stopping said computer system in response to said error signal, comprising:

system clock suspension means interposed between said first oscillator means and said second oscillator means and responding to said error signal from said error determination means and to said clock pulses from said first oscillator means for developing a suspension signal when a predetermined number of said clock pulses, greater than zero, are generated from said first oscillator means following the receipt of said error signal from said error determination means, said suspension signal suspending the generation of said system clock signal from said second oscillator means, the execution of said set of instructions terminating when said system clock signal is suspended, said computer system stopping when the execution of said set of instructions terminates, said system clock signal including odd cycles and even cycles, said suspension signal including an odd suspension signal for suspending the generation of the odd cycles of said system clock signal and an even suspension signal for suspending the generation of the even cycles of said system clock signal, said predetermined number of clock pulses including a first pulse and a last pulse, said system clock suspension means further comprising, first speed-up means responding to said error signal and to said clock pulses for generating said odd suspension signal at a leading edge of a first selected clock pulse, said first selected clock pulse being the last pulse within said predetermined number of clock pulses;

first maintaining means connected to said first speed-up means and responding to said first selected clock pulse for maintaining the generation of said odd suspension signal following the generation of said odd suspension signal by said first speed-up means;

second speed-up means responding to said error signal and to said first selected clock pulse for generating said even suspension signal at a leading edge of a second selected clock pulse, said second selected clock pulse being generated immediately subsequent to the generation of said predetermined number of clock pulses; and second maintaining means connected to said second speed-up means and responding to said second selected clock pulse for maintaining the generation of said even suspension signal following generation of said even suspension signal by said second speed-up means, whereby the odd cycles and the even cycles of said system clock are suspended and the execution of said set of instructions terminates when said odd suspension signal and said even suspension signal are simultaneously generated, said computer system stopping when the execution of said set of instructions terminates.

4. The apparatus of claim 3 wherein said predetermined number of clock pulses comprises two (2) clock pulses.

* * * * *